United States Patent [19]

James et al.

[11] Patent Number: 5,549,313

[45] Date of Patent: Aug. 27, 1996

[54] VELOCIPEDE WITH PROTECTIVE PADDED SHELL AND SOFT REMOVABLE COVER

[76] Inventors: Jay James; Roger Zak; Michael Loeffler; Robert Friezen, all of P.O. Box 871327, Wasilla, Ak. 99687-1327

[21] Appl. No.: 421,541

[22] Filed: Apr. 13, 1995

[51] Int. Cl.$^6$ ............................................. A63G 19/00
[52] U.S. Cl. ................. 280/221; 280/1.13; 280/1.188; 280/1.191; 446/99
[58] Field of Search ........................... 280/220, 221, 280/226.1, 227, 223, 224, 233, 1.13, 1.181, 1.87–1.195, 1.208, 259; 446/26, 27, 29, 465, 99, 267

[56] References Cited

U.S. PATENT DOCUMENTS

| | | | |
|---|---|---|---|
| 2,837,342 | 6/1958 | Kirk | 280/223 |
| 3,411,797 | 11/1968 | Wild | 280/1.191 |
| 3,811,695 | 5/1974 | Curtis | 280/1.192 |
| 4,816,002 | 3/1989 | Brodrib | 280/1.181 X |

FOREIGN PATENT DOCUMENTS

| | | | |
|---|---|---|---|
| 8803 | 2/1892 | United Kingdom | 280/226.1 |
| 94/07579 | 4/1994 | WIPO | 280/223 |

*Primary Examiner*—Eric D. Culbreth
*Assistant Examiner*—Victor E. Johnson
*Attorney, Agent, or Firm*—Michael Tavella

[57] ABSTRACT

A tricycle type vehicle that uses a reciprocating crank system to drive the vehicle is shown. In this design, the operating parts of the vehicle are enclosed by a padded shell that has a soft removable cover. The padded shell ensures that a child has no access to the moving parts while the vehicle is in motion The soft removable covers have different designs, such as animals (horses, lions, etc.), dinosaurs, cartoon characters, or any popular style. The soft covers are also designed to be used a bedding for children, throw rugs or as large stuffed toys. The device also has fenders to prevent contact with the large rear wheels. Finally, sound effects can be added to further enhance the overall operating effect as a toy.

14 Claims, 7 Drawing Sheets

VELOCIPEDE WITH PROTECTIVE PADDED SHELL AND SOFT REMOVABLE COVER

This invention relates to velocipedes propelled by a reciprocating crank utilizing the weight of the driver and particularly to velocipedes propelled by a reciprocating crank utilizing the weight of the driver that have a protective padded shell and soft, removable covers.

BACKGROUND OF THE INVENTION

Velocipedes have been in existence for well over one hundred years. The earliest forms were literally walkers. The rider propelled the vehicle by walking. This was not preferred because it produced no advantage. There then began development of powered vehicles that produced a mechanical advantage. During this stage there were at least two distinct lines of development. One lead to the common bicycle in use today, that uses pedals to turn a sprocket that engages a chain to turn the rear wheel. This line was well established by 1891. For example, U.S. Pat. No. 456,217 shows a bicycle that is essentially a single speed ladies bicycle of today.

The second line of vehicles uses a reciprocating crank system that rotates the rear wheel or wheels by pushing a pair of pedals in a reciprocating motion. The pedals are connected to a crank system that then turns the wheels. Many different types of vehicles have been developed using this system. U.S. Pat. No. 115,212, for example, shows an early model that uses the reciprocating system simply to drive the vehicle. This line eventually developed into the toy vehicles popular from 1950 on. Others learned to use the reciprocating motion to develop other types of drive mechanisms. One early example of such a vehicle is U.S. Pat. No. 529,717 to Deacon. Here, the rider sits in the seat and pushes the seat backwards and forwards. This action causes the crank to turn the rear wheel. The rider continues to push in this reciprocating manner to keep the vehicle moving. The inventor noted that it is a good form of exercise.

In 1947, U.S. Pat. No. Des. 146,645 to Donaldson was issued. This patent shows a design of a tricycle type vehicle that uses a reciprocating crank drive. However, not only does this vehicle propel the rider forward, it also causes the seat to move up and down as the rider operates the pedals. In 1972, U.S. Pat. No. 3,666,291 to Ortiz shows a more complex, four wheel version or the system that dispenses with the pedals and has the rider operate the vehicle by pushing on the seat. Finally, in 1992, U.S. Pat. No. 5,120,074 to Herman et al. described a four wheel vehicle that uses a modified version of the Donaldson device. The Herman vehicle, as explained in the Herman et al., patent, modified the Donaldson device by extending the frame and by moving the pivot points in an attempt to improve the performance of the vehicle.

Although all of these vehicles operate, they have one serious problem, especially for use as children's toys. The reciprocating components are all exposed and due to the reciprocating nature of the various pivots, the exposed parts can cause serious injury if arms, fingers, feet, toes or clothing get caught in the reciprocating mechanism.

SUMMARY OF THE INVENTION

The present invention overcomes the safety problems of the devices discussed above. It is a tricycle type vehicle that uses a reciprocating crank system that has been redesigned to make it safer. Moreover, the operating parts of the vehicle are enclosed by a padded shell to ensure that a child has no access to the moving parts while the vehicle is in motion. A soft removable cover is also used as a decoration. (Adult sized models need not have the soft removable cover, but can use one if desired). The soft removable covers have different designs, such as animals (horses, lions, etc.), dinosaurs, cartoon characters, or any popular style. Both the soft cover and the shell are designed for easy installation and removal. This allows the soft covers to be removed for cleaning, or to change the style of cover as desired. The padded shell can be removed to access the moving parts for maintenance and repairs. The soft covers are also designed to be used as bedding for children, throw rugs or as large stuffed toys.

Another safety feature used with this vehicle is a fender system. The fenders prevent contact with the large rear wheels. Also, although the fenders are not intended to be used as a braking system, the rider can lean against the fenders to push the fenders against the wheels, which causes the wheels to rub against the fenders, causing the wheel to slow down.

Finally, sound effects can be added to further enhance the overall operating effect as a toy.

It is an object of this invention to produce a velocipede that has a minimum of exposed moving parts.

It is another object of this invention to produce a velocipede that has a removable padded shell to enclose and shield the operating parts of the vehicle.

It is a further object of this invention to use the padded shell enclosure as a seat for the rider, thereby eliminating the need for an adjustable seat.

It is yet another object of this invention that soft removable covers can be placed over the padded shell.

It is yet another object of this invention that the soft removable covers are shaped in the form of animals, dinosaurs, or other characters popular with children.

It is yet another object of this invention to include a fender system that shields a rider from the wheels.

It is yet another object of this invention to include a fender system that can be used as an emergency breaking system for the vehicle.

It is yet another object of this invention to include a sound system on the vehicle that reproduces various sound effects to enhance the use of the device as a toy for children.

It is yet a further object of this invention to produce a velocipede that may be used indoor or outdoors as a stationary exerciser.

DETAILED DESCRIPTION OF THE INVENTION

Figure 1:
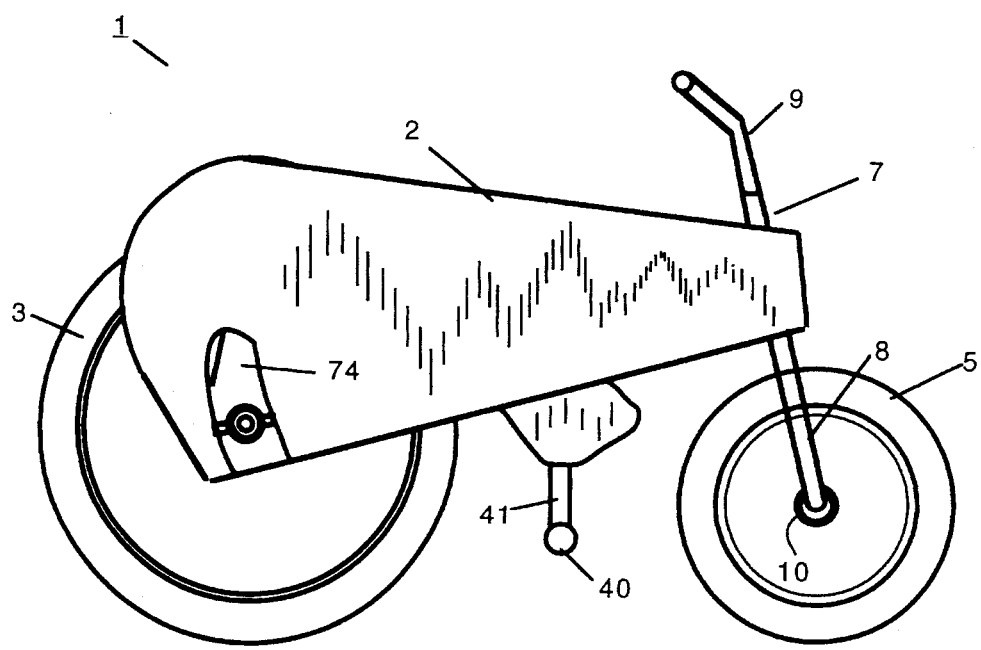
FIG. 1 is a side view of-the invention with the padded enclosure shell in place and the seat in a mid-level position.
Figure 2:
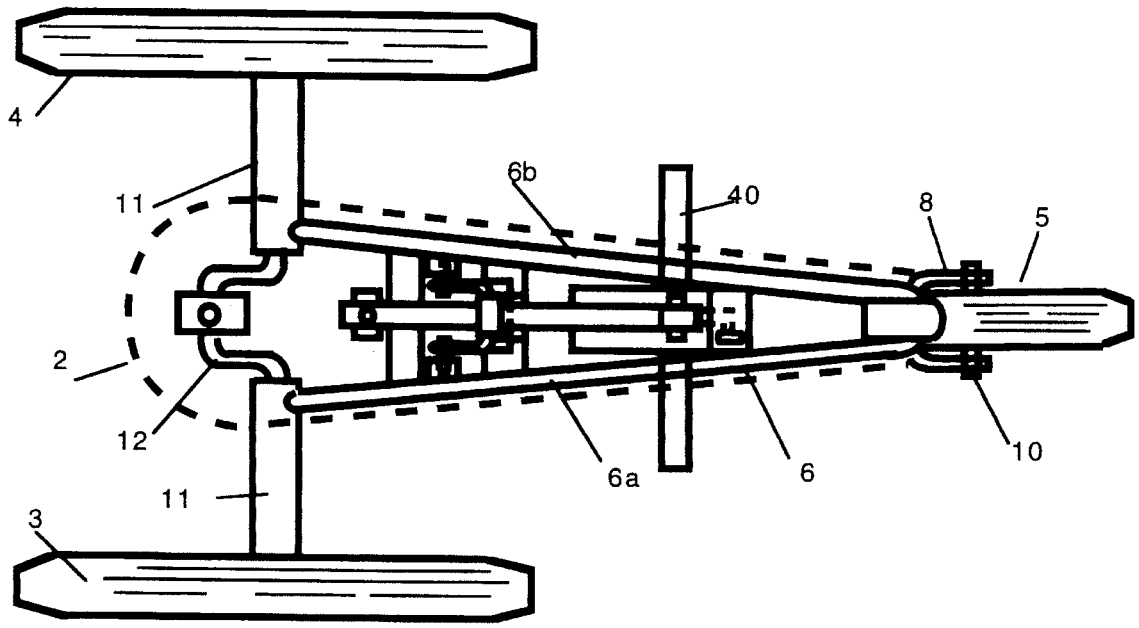
FIG. 2 is a top plan view of the invention with the padded enclosure shell shown in dashed line.
Figure 3:
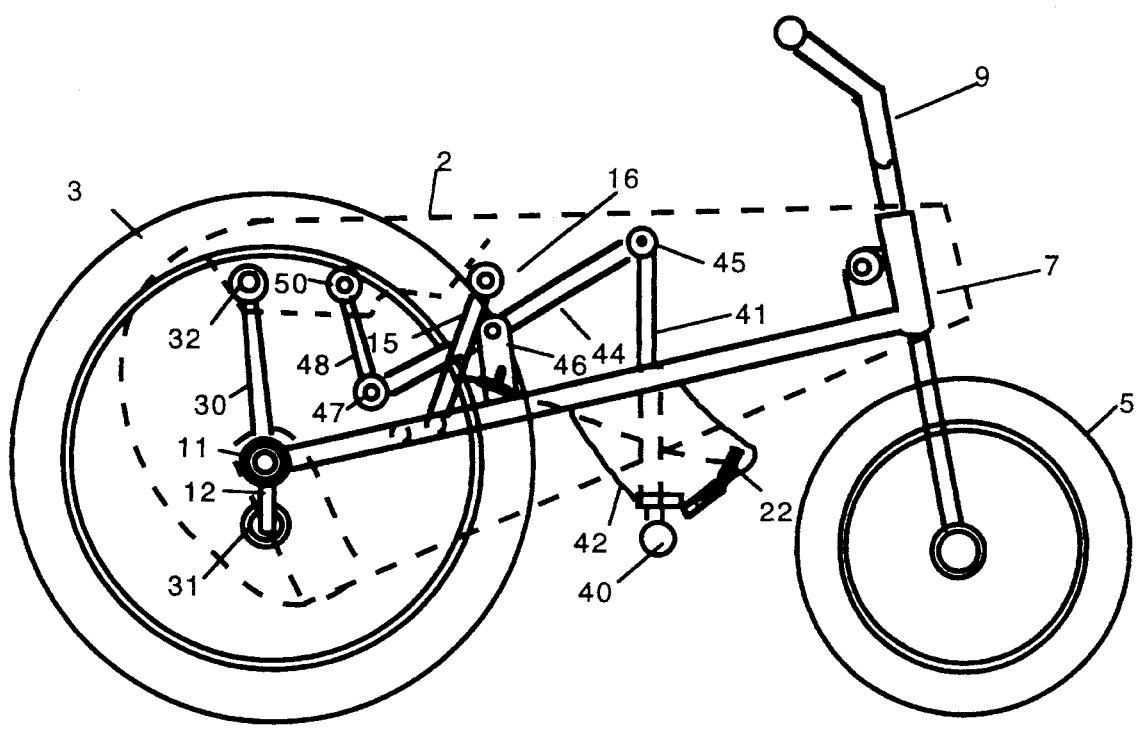
FIG. 3 is a side view of the invention with the padded enclosure shell shown in dashed line and the seat in the lowest position and the stop bar released.

Referring now to FIGS. 1, 2, and 3, the improved velocipede 1 is shown. FIG. 1 shows the velocipede 1 with padded enclosure shell 2. The padded enclosure shell 2 is also the seat for the velocipede 1. Using the padded enclosure shell 2 as the seat permits the rider to take any position along the top of the padded enclosure shell 2.

In most of the figures, the padded enclosure shell 2 is shown in dashed lines to show inner details of the mechanisms clearly.

Figure 12:
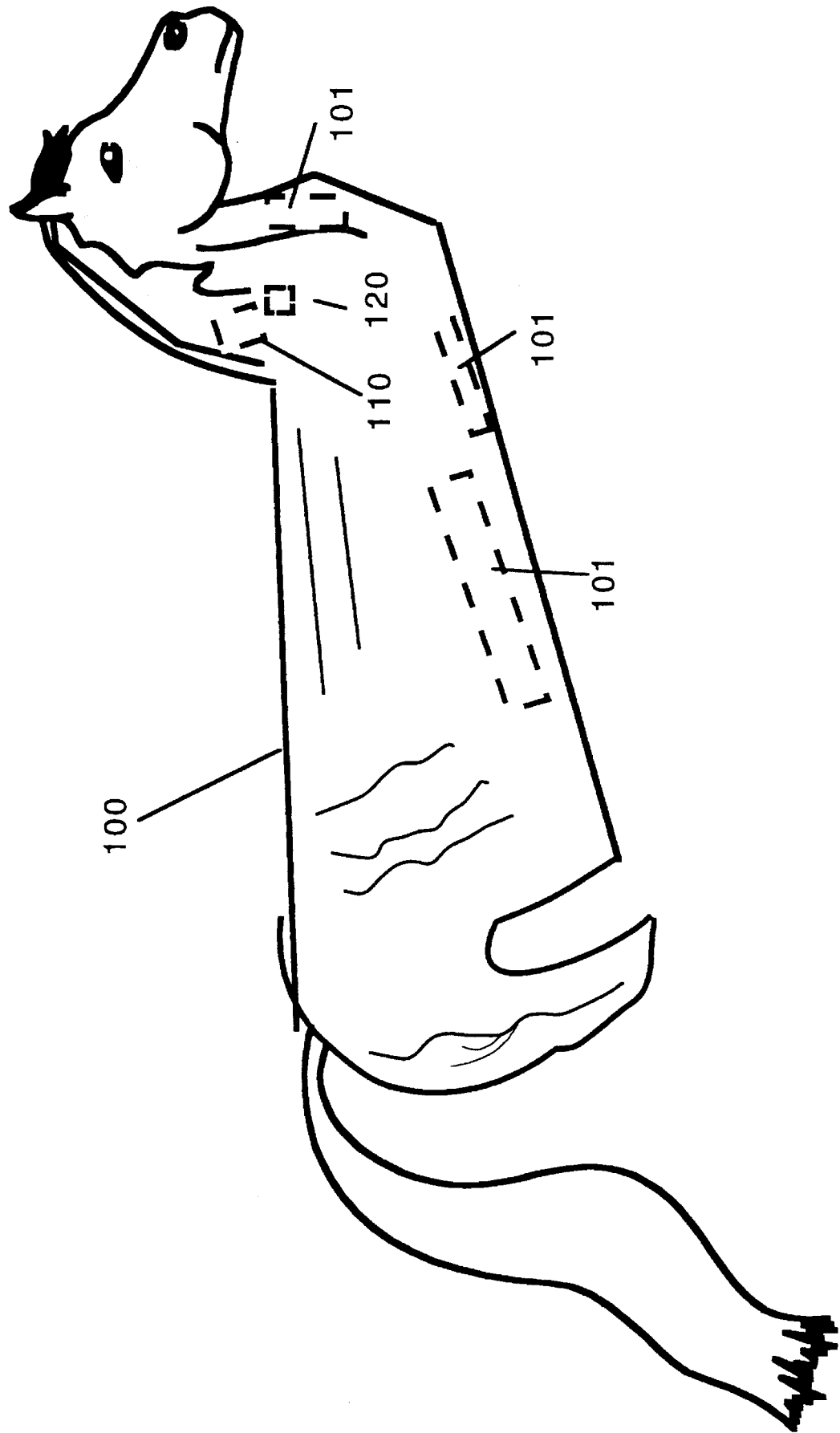
FIG. 12 is a detail view of one style of soft removable cover, removed from the velocipede.
Figure 13:
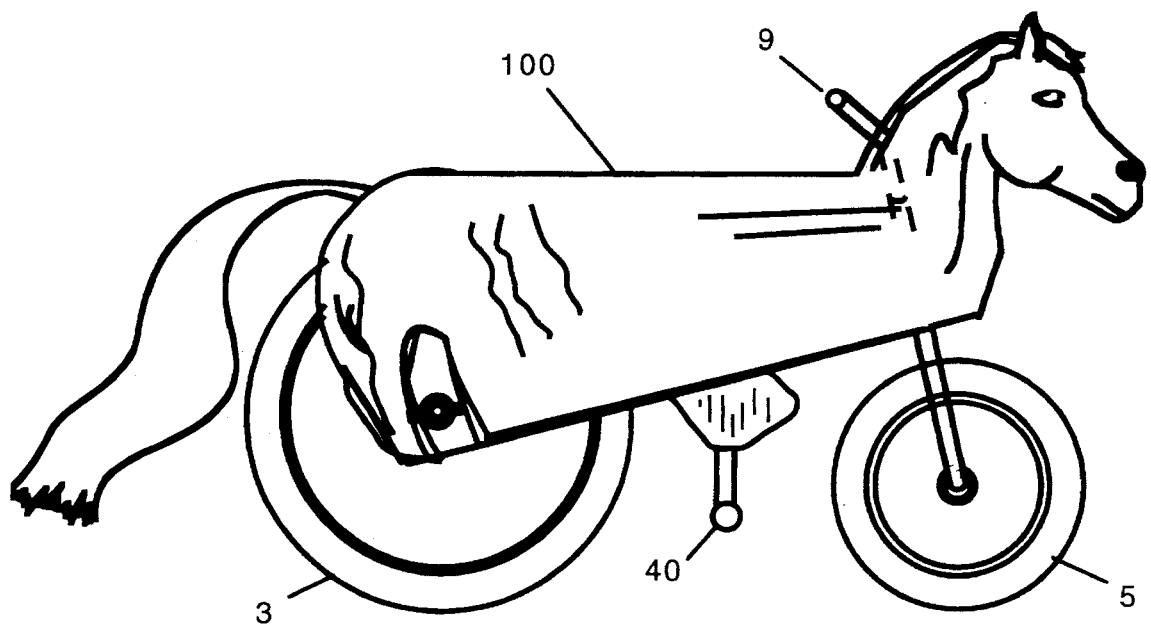
FIG. 13 is a side view of the invention with the soft cover installed.

The preferred embodiment uses a soft removable cover 100 (see FIGS. 12 and 13) that fits over the padded enclosure shell 2. The soft removable cover 100 is designed to be easily removed. The soft removable cover 100 has a decorative shape. Several styles the decorative shape of the soft removable cover 100 are contemplated to better appeal to children. For example, the figures show a soft removable cover 100 in the form of a horse. Any other design may be used, however. Dinosaurs, cartoon characters, movie characters and the like may be used as cover designs. In this way, an owner of the velocipede 1 may have several soft removable covers 100. As discussed below, the removal of one cover and replacement of another is a simple task, which facilitates owning several cover styles. The soft removable covers 100 are secured to the padded enclosure shell 2 using strips of VELCRO 101, a popular hook and loop fastener system. The strips of VELCRO 101 may be positioned around the soft removable cover 100 in whatever configuration works best for the shape of the soft removable cover 100. FIG. 13 shows one style of soft cover 100 in place on the velociped.

Referring to FIGS. 3, 4, 5, 6 and 7, details of the operation of the velocipede 1 are shown. Note that to make the velocipede 1 safe, the design found in earlier designs, such as that of Donaldson and the Herman et al. patents had to be modified. The main problem with the Donaldson and Herman et al. patents is that the operating mechanisms are open and exposed. Thus, it is quite feasible that a child could get fingers or toes caught in the crank-rod mechanisms of either of the patents mentioned above. To prevent such injuries, enclosing the mechanism is a good answer. However, in order to enclose the mechanism and still have it work, the mechanism had to be redesigned to work within the confines of the enclosure.

Referring to FIGS. 2, 3, 4, 5, 6 and 7, the velocipede 1 has three wheels: rear wheels, 3 and 4, and a front wheel 5 used for steering. The wheels, 3, 4 and 5 are made of common rubber with metal rims, similar to those used on bicycles. In the preferred embodiment, the wheels 3 and 4 are designed to be spokeless, or have the spokes covered to reduce possibility of injury. Only one of the rear wheels (either 3 or 4) is a drive wheel. The other rear wheel is free wheeling. Only one drive wheel is used to improve the steerability of the velocipede 1.

The wheels 3 and 4 are connected by a triangular frame 6. As shown in FIG. 3, the frame 6 is split into two members 6a and 6b. The frame 6 attached to a fork column 7. This column supports a standard bicycle fork 8 A pair of handle bars 9 are attached to the fork in a standard manner. The front wheel 5 is attached to the fork 8 by an axle 10 and fasteners common to the bicycle industry. The rear wheels 3 and 4 are attached to the frame 6 using frame support members 11. See FIGS. 2 and 7. The frame support members 11 are hollow cylinders. This allows the primary drive axle 12 to pass through the frame support members 11 and be connected to rear wheel 3 or 4 using ordinary fasteners, and bearings 13. Note that the primary drive axle 12 is not a straight piece. This axle forms one part of the crank system (discussed in greater detail below).

Figure 4:
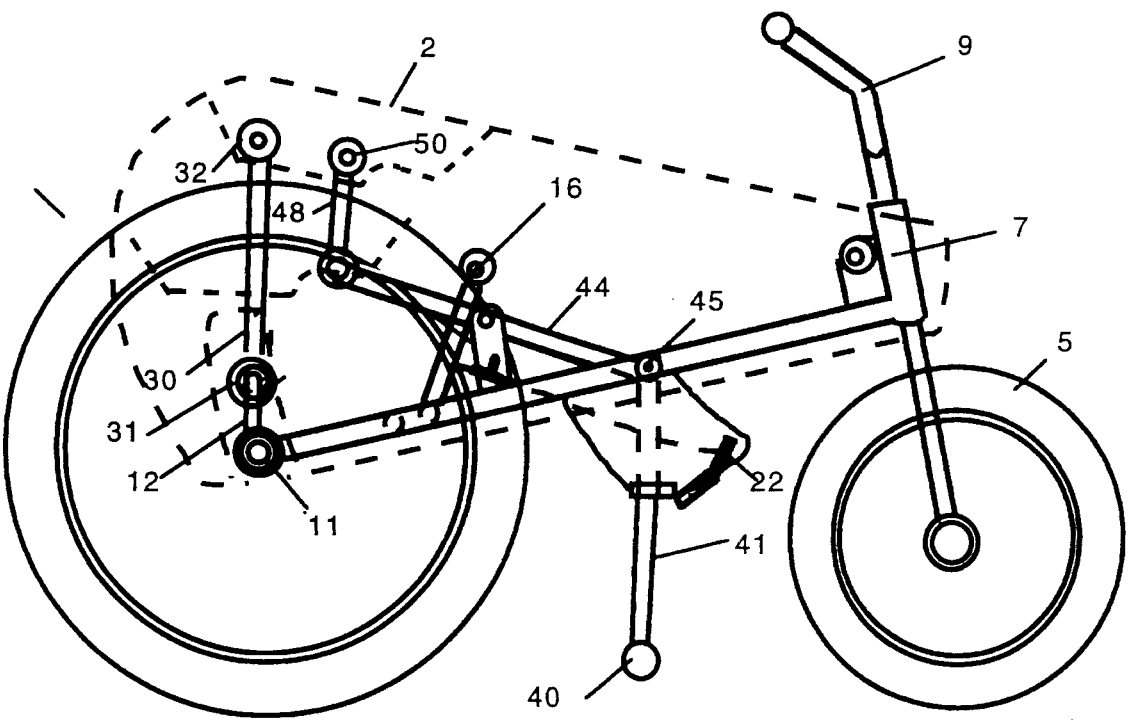
FIG. 4 is a side view of the invention with padded enclosure shell shown in dashed line and the seat in the highest position and the stop bar released.

Referring to FIGS. 3, 4, 5 and 6, details of the crank system are shown. Referring to FIGS. 3 and 4, The primary drive axle 12 is connected to a seat push rod 30. A bearing 31 is provided for proper operation of the seat push rod 30. The seat push rod 30 has a pivot bearing 32 attached at the top of the rod 30 as shown. The bearing 32 is then attached to the padded enclosure shell 2. Thus, as the rear wheels 3 and 4 turn in a clockwise rotation, the seat push rod 30 is pulled down to the lowest point of the crank cycle. Then the seat push rod 30 is pushed upward to the top of the crank cycle. Because the seat push rod 30 is attached to the padded enclosure shell 2, the padded enclosure shell 2 is concomitantly raised and lowered.

The drive wheel 3 and the movement of the padded enclosure shell 2 are powered by the rider. The rider, sitting on the padded enclosure shell 2, places his or her feet on a foot rest 40. The foot rest 40 is attached to a connecting rod 41 as shown. The foot rest 40 and connecting rod 41 are held in position by a frame member 42, which is attached to the frame 6. A grommet bearing 43 is provided for the connecting rod 41 (see FIGS. 5 and 6). This configuration allows the foot rest 40 and connecting rod 41 assembly to move vertically. A drive rod 44 is connected to the top of the connecting rod 41. A pivot bearing 45 is provided to allow the drive rod 44 to pivot about the connecting rod 41. A second pivot point 46 is provided to shift to vertical movement of the connecting rod 41 to a horizontal movement of the drive rod 44. The other end of the drive rod 44 is connected to a pivot bearing 47, which is connected to a seat lifting rod 48. The seat lifting rod 48 is connected to the front of the padded enclosure shell 2 using another pivot bearing 50.

The basic operation of the device now follows: beginning with FIG. 3, for example, the rider's feet are at the top of the stroke, on the footrests. 40. As the rider pushes down on the foot rests 40, the connecting rod 41 is pulled down, which causes the drive rod 44 to pivot from the upward angled position of FIG. 3 to the lower level position shown in FIG. 4. This causes the padded enclosure shell 2 to be pushed upward, as shown. As the padded enclosure shell 2 is pushed upward, the seat push rod 30 is pulled upward, causing the primary drive axle 12 to be turned forward. At the top of the stroke, the rider pushes down on the padded enclosure shell 2 and removes tension from the foot rests 40. This causes the padded enclosure shell 2 to be pushed down, driving the rear wheels 3 and 4 through the rest of the cycle, while forcing the foot rests 40 to the upper position, ready for the next stroke. To allow the rear axle to connect to the wheels 3 and 4, the padded enclosure shell 2 has a curved guide 74 as shown. The curved guide 74 allows the padded enclosure shell 2 to pass over the axle connections as shown in FIGS. 3 and 4.

In this manner, the rider can drive the velocipede 1 in either a forward or backward direction. Once in motion, the forward velocity can be maintained as long as the rider desires. The velocipede 1 is steered by turning the front wheel 5 using the handlebars 8 in exactly the same manner as used on an ordinary bicycle.

Figure 5:
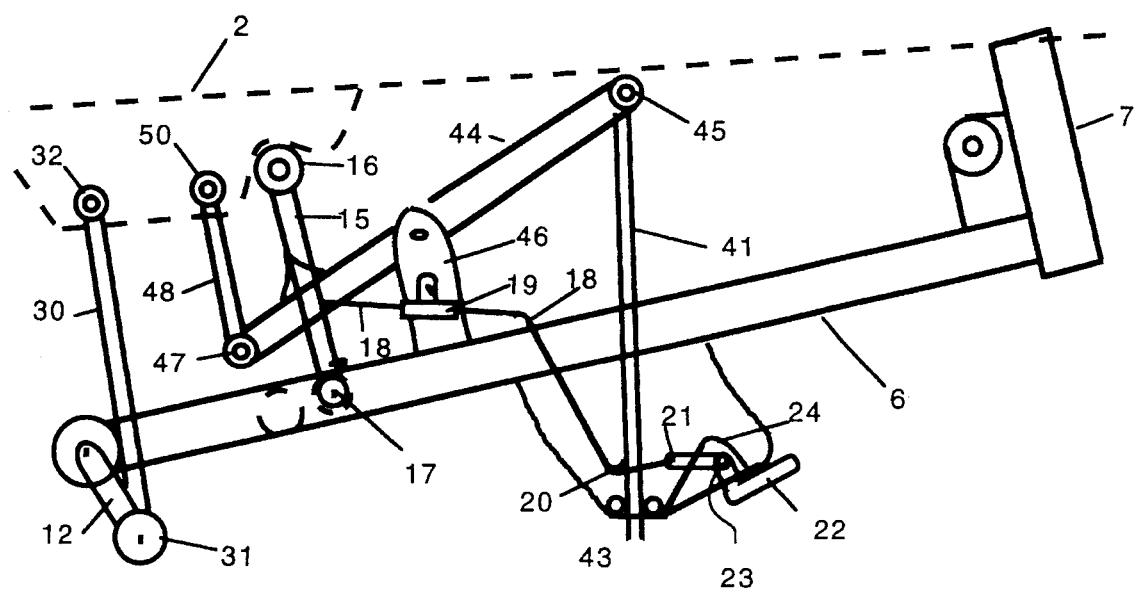
FIG. 5 is a detail of the operating mechanism with the padded enclosure shell shown in dashed line and the seat in the lowest position with the stop bar set.
Figure 6:
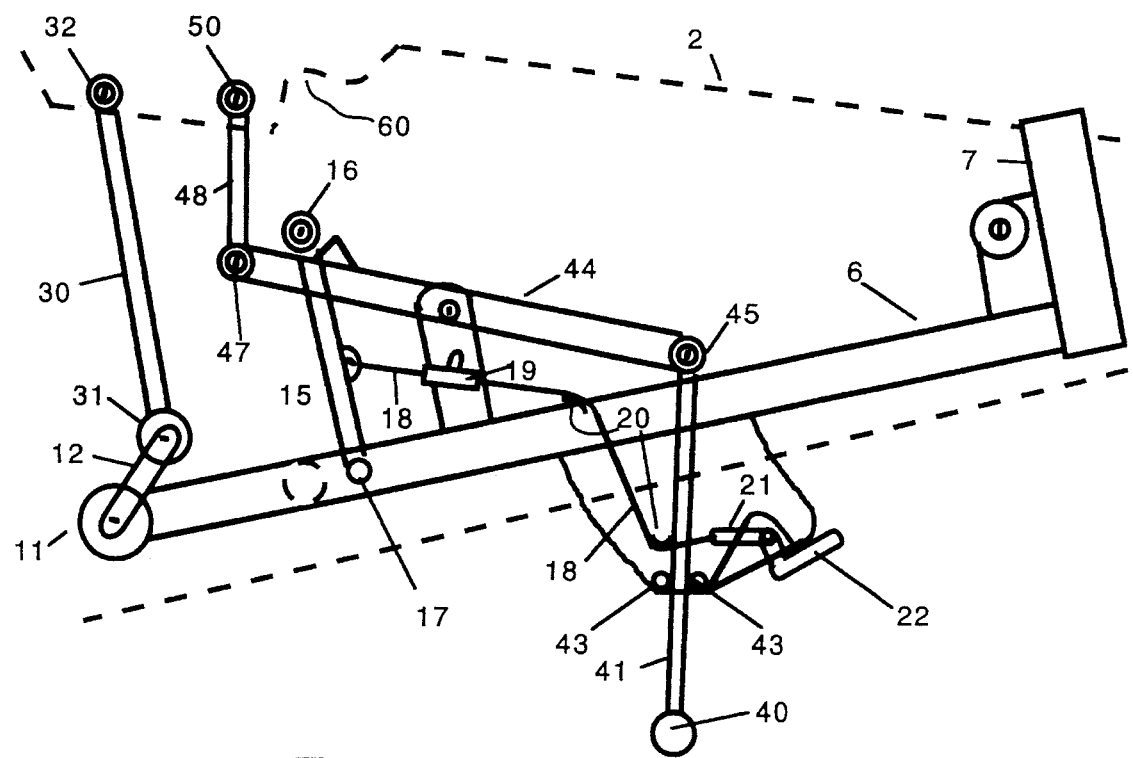
FIG. 6 is a detail of the operating mechanism with the padded enclosure shell shown in dashed line and the seat in the highest position with the stop bar set.
Figure 7:
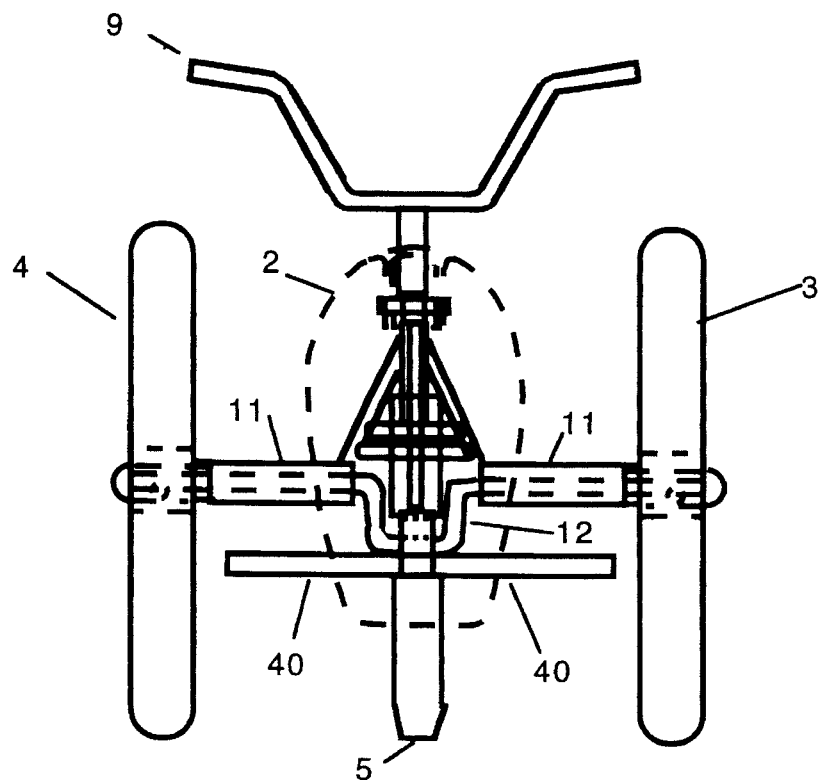
FIG. 7 is a rear view of the invention with the padded enclosure shell shown in dashed line.
Figure 8:
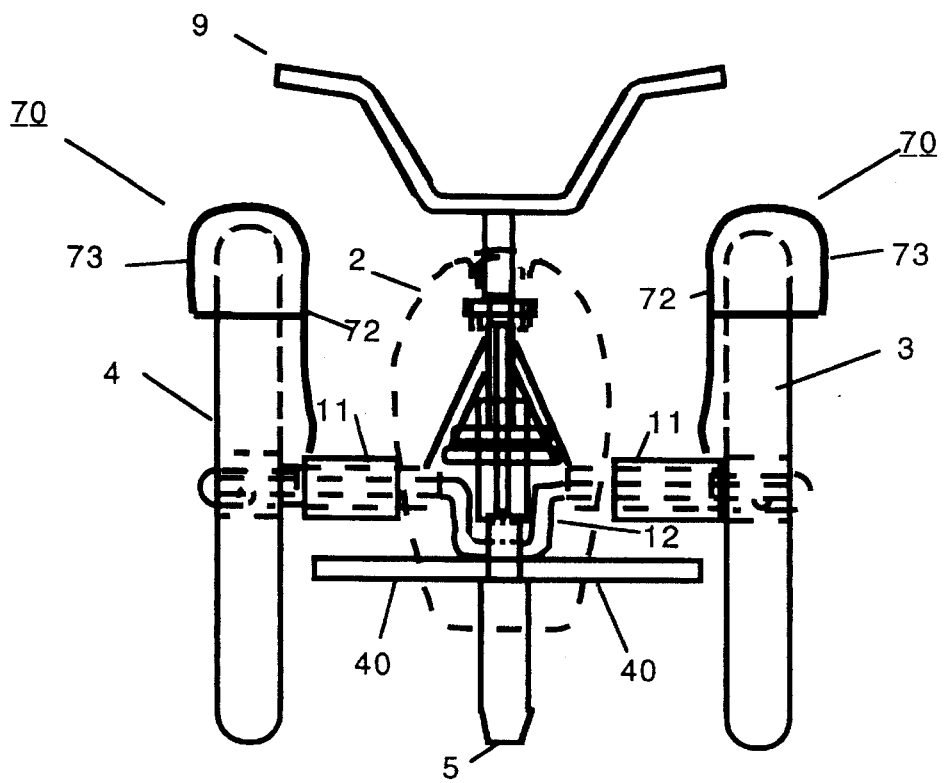
FIG. 8 is a rear view of the invention with padded enclosure shell shown in dashed line and a set of protective fenders installed.
Figure 9:
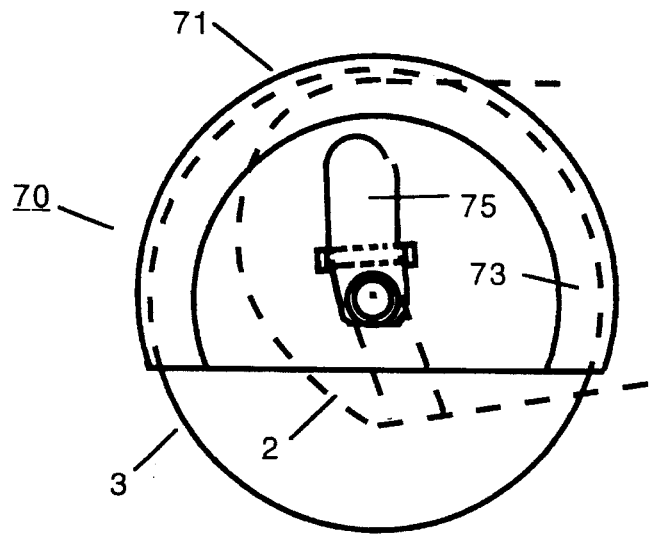
FIG. 9 is a side detail view of one protective fender.
Figure 10:
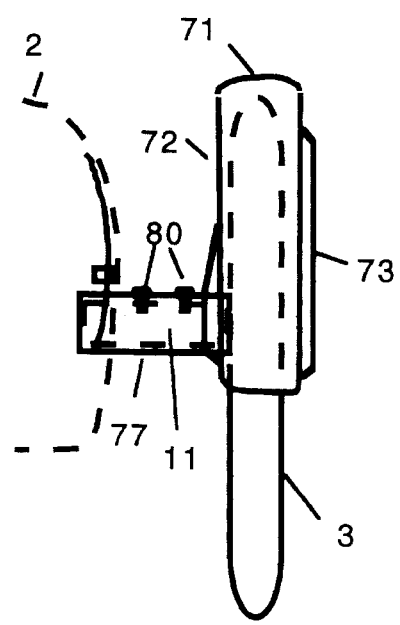
FIG. 10 is a detail rear view of the protective fender attachment system.
Figure 11:
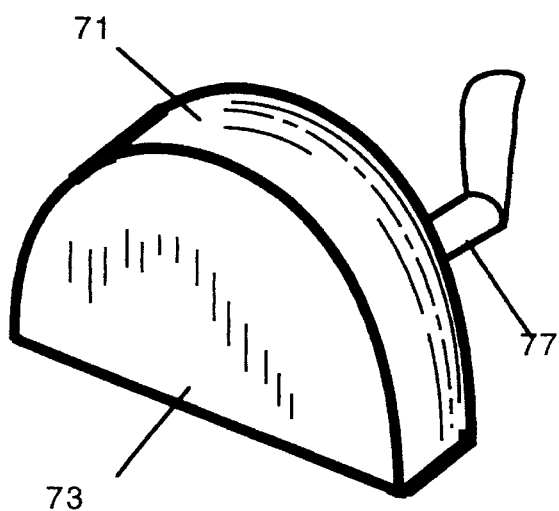
FIG. 11 is a perspective view of one protective fender.

The preferred embodiment of the velocipede 1 has a stop bar system. The stop bar system is used to limit the travel of the crank system under certain circumstances. FIGS. 3 and 4 show the stop bar system disengaged. FIGS. 5 and 6 show the stop bar system engaged. The stop bar system has a stop bar 15 that has a stop pad 16 attached at the top of the stop bar 15. The stop bar 15 is connected to the frame 6 at a pivot 17. The pivot 17 allows the stop bar 15 to move backward or forwards as needed. The stop bar 15 is controlled by a cable and lever system. A cable 18 is attached to the stop bar 15 as shown. The cable 18 is run along the frame 6 supported by cable guides 19 and 20 as shown. The cable 18 attached to a control arm 21, which is connected to an operating lever 22 as shown. Both the control arm 21 and the operating lever 22 are attached to a pivot pin 23, which is connected to support 24. The cable system is operated by pulling the operating lever 22 either up or down. In FIGS. 5 and 6, for example, the operating lever 22 is in the down position and the stop bar 15 is engaged. Pushing the operating lever 22 up causes the cable 18 to be pulled down and forward, which causes the stop bar 15 to be pulled forward (see FIGS. 3 and 4). In the forward position, the stop bar 15 is not engaged.

As discussed above, a stop bar 15 can be used to limit the range of vertical travel for the velocipede 1. Referring to FIGS. 3, 4, 5 and 6, the stop bar 15 is designed to limit the crank cycle so that the primary drive axle 12 cannot turn over a full cycle. As shown in FIG. 3, a notch 60 is formed into the padded enclosure shell 2. The stop bar 15 is designed to fit into the notch 60 when the stop bar 15 is set. As FIG. 3 illustrates, with the stop bar 15 in the non-set position, the notch 60 descends below the level of the stop bar 15. This shows the full extent of downward travel by the padded enclosure shell 2. With the stop bar 15 set, the padded enclosure shell 2 descends until the notch 60 hits the top of the stop bar 15 as shown. This position is not the lowest level that the padded enclosure shell 2 can descend. As such, the primary drive axle 12 does not reach the peak of its cycle, preventing the velocipede 1 from advancing a full turn.

The stop bar 15 can be used to limit the travel of the velocipede 1 when used with small children, or when the device is used indoors.

Referring to FIGS. 8, 9, 10, and 11, a fender system is shown. The fenders 70 have a top cover 71, an inner cover 72, which is a half circle, and an outer cover 73. Note that the inner and outer covers 72 and 73 have a guide 75 formed in the wall to match the guide 74 in the padded enclosure shell 2 (see, e.g., FIG. 1 and the discussion above.). The fender is attached to the axles by a pair of tubular members 77, which are fastened to the axle by standard fasteners 80.

Figure 14:
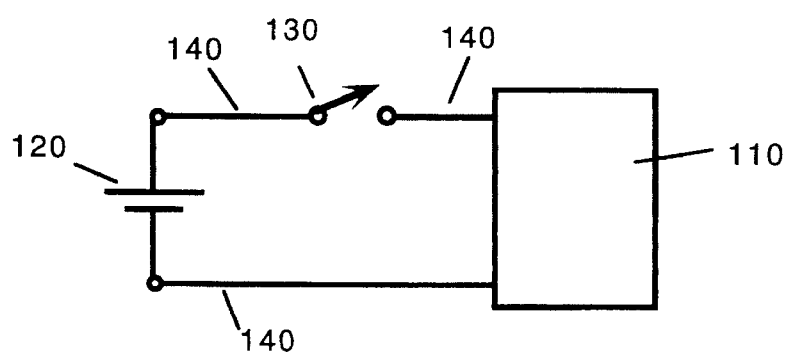
FIG. 14 is a schematic diagram of the sound effects circuit.

Finally, sound effect device 110 may be installed within the soft removable cover 100 to add realism to the velocipede 1 when it is used as a toy. The sound effect device 110 is a battery powered electronic device well known in the art. Any such miniature sound effect device 110 may be used. Of course, the sound effect should match the style of the soft cover 100. For example, a horse shaped cover has a horse sound effect, a lion shaped cover has a roaring sound, etc. FIG. 14 shows a schematic diagram of the sound effect circuit. Here, the sound effect device 110 is connected to a battery supply 120 through a switch 130. Note that in the preferred embodiment, the sound effect device 110 and the battery supply 120 are installed within the soft cover 100. The switch 130 is installed within the handlebars 9. Wiring 140 can be run to the soft cover 100 and an appropriate connector (not shown) can be used to hook the switch 130 into the battery-sound effect device circuit. These connections are well known in the art. The placement in the handlebars 9 is preferred because it lets the rider activate the sound effect without having to remove the rider's hands from the handlebars.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. A velocipede comprising:

a) a rigid frame, having a front end and a rear end;

b) a front wheel assembly, operably connected to said front end of said rigid frame;

c) a rear wheel assembly, operably connected to said rear end of said rigid frame;

d) a crank, operably associated with said rear wheel assembly such that rotation of said crank causes corresponding rotation of said rear wheel assembly;

e) a padded rigid enclosure shell, having a front portion and a rear portion, movably positioned over said rigid frame and rear wheel assembly, and forming a rigid, structural member of said velocipede;

f) a push rod, having a first end and a second end, said first end of the push rod being rotatably connected to said crank, and the second end of the push rod being pivotally connected to the padded enclosure shell;

g) a seat lifting rod, having a first end and a second end, said first end being pivotally connected to the padded enclosure shell;

h) a drive rod, having a first end and a second end and including a pivot disposed in an intermediate position, said first end of the drive being pivotally connected to said second end of said seat lifting rod, such that during operation of the velocipede, the padded, rigid enclosure shell has a vertical travel;

i) a member, fixedly attached to said rigid frame at a point intermediate of the front end-and rear end of said rigid frame, and also being pivotally connected to the pivot on said drive rod;

j) a second connecting rod, having a top end and a bottom end, the top end being pivotally connected to the second end of said drive rod;

k) a foot rest, fixedly connected to said bottom end of said second connecting rod;

l) a means for limiting the vertical travel of said padded, rigid enclosure shell, said means including a stop bar, having a first end and a second end, said first end being pivotally attached to said rigid frame at a point intermediate the front end and rear end of said rigid frame, such that said stop bar can be pivoted to either an engaged position, or a disengaged position, such that when said stop bar is in the engaged position, the second end of said stop bar makes contact with said padded, rigid enclosure shell during the vertical travel of said padded, rigid enclosure shell, thereby limiting the vertical travel of said padded, rigid enclosure shell and further such that when the stop bar is in the disengaged position, said second end of said stop bar makes no contact with said padded, rigid enclosure shell during said vertical travel of said padded, rigid enclosure shell; and m) a means for positioning said stop bar into said engaged position, or disengaged position.

2. The velocipede of claim 1 further comprising:

a) means for steering said velocipede, incorporated within said front wheel assembly.

3. The velocipede of claim 1 further comprising:

a) a soft cover, being removably placed over said padded rigid enclosure shell; and b) means for removably fastening said soft cover.

4. The velocipede of claim 3 wherein said soft cover has a decorative shape.

5. The velocipede of claim 3 further comprising a means for creating sound effects removably installed within said soft cover.

6. The velocipede of claim 4 wherein the decorative shape of said soft cover is selected from the group of: animals, dinosaurs, and animated characters.

7. A velocipede comprising:

a) a rigid frame having a front end and a rear end;

b) a front wheel assembly, operably connected to said front end of said rigid frame;

c) a rear wheel assembly, operably connected to said rear end of said rigid frame;

d) a crank, operably associated with said rear wheel assembly such that rotation of said crank causes corresponding rotation of said rear wheel assembly;

e) a padded, rigid enclosure shell, having a front portion and a rear portion, movably positioned over said rigid frame and rear wheel assembly, and forming a rigid, structural member of said velocipede;

f) a push rod, having a first end and a second end, said first end of the push rod being rotatably connected to said crank, and the second end of the push rod being pivotably connected to the padded, rigid enclosure shell;

g) a seat lifting rod having a first end and a second end, said first end being pivotably connected to the padded, rigid enclosure shell;

h) a drive rod having a first end and a second end and including a pivot disposed in an intermediate position, said first end of the drive rod being pivotably connected to said second end of said seat lifting rod, such that during operation of the velocipede, the padded, rigid enclosure shell has a vertical travel;

i) a member, fixedly attached to said rigid frame at a point intermediate of the front end and rear end of said rigid frame, and also being pivotably connected to the pivot on said drive rod;

j) a second connecting rod, having a top end and a bottom end, the top end being pivotably connected to the second end of said drive rod;

k) a foot rest fixedly connected to said bottom end of said second connecting rod;

l) a means for steering said velocipede, incorporated within said front wheel assembly;

m) a means for limiting the vertical travel of said padded, rigid enclosure shell, said means for limiting having a stop bar, having a first end and a second end, said first end being pivotably attached to said rigid frame at a point intermediate the front end and rear end of said rigid frame, such that said stop bar can be pivoted to either an engaged position, or a disengage position, such that when said stop bar is in the engaged position, the second end of said stop bar makes contact with said padded, rigid enclosure shell during the vertical travel of said padded, rigid enclosure shell thereby limiting the travel of said padded, rigid enclosure shell and further such that when the stop bar is in the disengaged position, said second end of said stop bar makes no contact with said padded, rigid enclosure shell during said vertical travel of said padded, rigid enclosure shell: and n) means for positioning said stop bar into said enagaged position or said disengaged position.

8. The velocipede of claim 7 further comprising:

a) a soft cover, being removably placed over said padded enclosure shell; and b) means for removably fastening said soft cover.

9. The velocipede of claim 8 further comprising a means for creating sound effects removably installed within said soft cover.

10. The velocipede of claim 8 wherein said soft cover is formed into a decorative shape.

11. The velocipede of claim 10 wherein the decorative shape of said soft cover is selected from the group of: animals, dinosaurs, and animated characters.

12. A velocipede comprising:

a) a rigid frame, having a front end and a rear end;

b) a front wheel assembly, operably connected to said front end of said rigid frame;

c) a rear wheel assembly, operably connected to said rear end of said rigid frame;

d) a crank, operably associated with said rear wheel assembly such that rotation of said crank causes corresponding rotation of said rear wheel assembly;

e) a padded, rigid enclosure shell, having a front portion and a rear portion, movably positioned over said rigid frame and rear wheel assembly, and forming a rigid, structural member of said velocipede;

f) a push rod, having a first end and a second end, said first end of the push rod being rotatably connected to said crank, and the second end of the push rod being pivotably connected to the padded, rigid enclosure shell;

g) a seat lifting rod, having a first end and a second end, said first end being pivotably connected to the padded, rigid enclosure shell;

h) a drive rod, having a first end and a second end and including a pivot disposed in an intermediate position, said first end of the drive rod being pivotably connected to said second end of said seat lifting rod, such that during operation of the velocipede, the padded, rigid enclosure shell has a vertical travel;

i) a member, fixedly attached to said rigid frame at a point intermediate of the front end and the rear end of said rigid frame, and also being pivotably connected to the pivot on said drive rod;

j) a second connecting rod, having a top end and a bottom end, the top end being pivotably connected to the second end of said drive rod;

k) a foot rest fixedly connected to said bottom end of said second connecting rod;

l) a means for steering said velocipede, incorporated within said front wheel assembly;

m) a stop bar, having a first end and a second end, said first end being pivotably attached to said rigid frame at a point intermediate the front end and rear end of said rigid frame, such that said stop bar can be pivoted to either an engaged position or a disengaged position, such that when said stop bar is in the engaged position, the second end of said stop bar makes contact with said padded, rigid enclosure shell during the vertical travel of said padded, rigid enclosure shell, thereby limiting the vertical travel of said padded, rigid enclosure shell and further such that when the stop bar is in the disengaged position, said second end of said stop bar makes no contact with said padded, rigid enclosure shell during said vertical travel of said padded, rigid enclosure shell;

n) means for positioning said stop bar into said engaged position or said disengaged position;

o) a soft cover, being removably placed over said padded, rigid enclosure shell;

p) means for removably fastening said soft cover about said padded, rigid enclosure shell; and q) a means for creating sound effects, removably installed within said soft cover.

13. The velocipede of claim 12 wherein said soft cover has a decorative shape.

14. The velocipede of claim 13 wherein the decorative shape of said soft cover is selected from the group of: animals, dinosaurs, and animated characters.

* * * * *